(12) United States Patent
Deshpande et al.

(10) Patent No.: US 8,875,254 B2
(45) Date of Patent: Oct. 28, 2014

(54) CACHE SHARING OF ENTERPRISE DATA AMONG PEERS VIA AN ENTERPRISE SERVER

(75) Inventors: Ashish A. Deshpande, Pune (IN); Anbumunee Ponniah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/568,369

(22) Filed: Aug. 7, 2012

(65) Prior Publication Data

US 2014/0047516 A1 Feb. 13, 2014

(51) Int. Cl.
*G06F 7/04* (2006.01)
*G06F 15/16* (2006.01)

(52) U.S. Cl.
USPC .............................................. 726/5; 709/204

(58) Field of Classification Search
CPC ... H04L 63/08; H04L 63/083; H04L 63/0815; H04L 63/0823; H04L 63/102; G06F 21/31; G06Q 10/101
USPC ................ 726/1, 5, 6; 713/168; 709/201, 204
See application file for complete search history.

(56) References Cited

U.S. PATENT DOCUMENTS

| | | | |
|---|---|---|---|
| 5,878,218 A | 3/1999 | Maddalozzo, Jr. et al. | |
| 6,167,438 A | 12/2000 | Yates et al. | |
| 6,205,481 B1 | 3/2001 | Heddaya et al. | |
| 6,421,733 B1 * | 7/2002 | Tso et al. | 709/246 |
| 7,146,429 B2 | 12/2006 | Michel | |
| 7,254,608 B2 * | 8/2007 | Yeager et al. | 709/203 |
| 7,320,143 B2 * | 1/2008 | Le Pennec et al. | 726/30 |
| 7,571,285 B2 * | 8/2009 | Hughes et al. | 711/130 |
| 7,617,322 B2 | 11/2009 | Ahmed et al. | |
| 8,028,129 B2 * | 9/2011 | Hughes et al. | 711/130 |
| 8,037,202 B2 * | 10/2011 | Yeager et al. | 709/238 |
| 8,051,145 B2 * | 11/2011 | Wu et al. | 709/219 |
| 8,135,812 B2 | 3/2012 | Lowery et al. | |
| 8,185,650 B2 * | 5/2012 | Lau et al. | 709/231 |
| 8,271,574 B1 * | 9/2012 | Srinivasan et al. | 709/201 |
| 8,402,556 B2 * | 3/2013 | Bradley | 726/30 |
| 8,412,764 B1 * | 4/2013 | Liskov et al. | 709/201 |
| 8,447,831 B1 * | 5/2013 | Sivasubramanian et al. | 709/217 |

(Continued)

OTHER PUBLICATIONS

Mohan, C., "Caching Technologies for Web Applications," http://www.almaden.ibm.com/u/mohan/Caching_VLDB2001.pdf, Sep. 12, 2001.

(Continued)

*Primary Examiner* — Abu Sholeman
(74) *Attorney, Agent, or Firm* — Robert A. Voigt, Jr.; Winstead, P.C.

(57) ABSTRACT

A method, system and computer program product for performing cache sharing of enterprise data among peer mobile devices. An enterprise server receives a request from a mobile device for enterprise data. Upon identifying peer mobile device(s) that store the requested enterprise data, the enterprise server selects one of these peer mobile devices to provide the requested enterprise data based on an algorithm. A message is sent to the selected peer mobile device from the enterprise server to provide the requested enterprise data to the requesting mobile device, where the message includes connection details as well as a key that uniquely identifies the requested enterprise data that is stored in a cache of the peer mobile device. In this manner, the enterprise data may be shared in a robust and transparent manner while at the same time providing the enterprise control over the dissemination of the enterprise data.

17 Claims, 5 Drawing Sheets

(56) References Cited

U.S. PATENT DOCUMENTS

| | | | |
|---|---|---|---|
| 8,478,250 B2* | 7/2013 | Rao | 455/414.1 |
| 8,243,996 B2* | 7/2013 | Rao | 455/414.1 |
| 8,655,930 B2* | 2/2014 | Beichter et al. | 707/826 |
| 2003/0182171 A1* | 9/2003 | Vianello | 705/9 |
| 2004/0030651 A1* | 2/2004 | Kim et al. | 705/51 |
| 2004/0088348 A1* | 5/2004 | Yeager et al. | 709/202 |
| 2004/0133640 A1* | 7/2004 | Yeager et al. | 709/204 |
| 2006/0114883 A1* | 6/2006 | Mehta et al. | 370/352 |
| 2006/0155759 A1 | 7/2006 | Ramachandran et al. | |
| 2008/0022049 A1* | 1/2008 | Hughes et al. | 711/130 |
| 2008/0109843 A1* | 5/2008 | Ullah | 725/34 |
| 2008/0125089 A1* | 5/2008 | Ullah | 455/411 |
| 2008/0172718 A1* | 7/2008 | Bradley | 726/1 |
| 2008/0243996 A1* | 10/2008 | Wu et al. | 709/203 |
| 2009/0089565 A1* | 4/2009 | Buchanan et al. | 713/1 |
| 2009/0161592 A1* | 6/2009 | So | 370/312 |
| 2009/0259847 A1* | 10/2009 | Li | 713/168 |
| 2009/0271572 A1* | 10/2009 | Hughes et al. | 711/121 |
| 2009/0282123 A1* | 11/2009 | Fornari | 709/207 |
| 2010/0030871 A1 | 2/2010 | Jolly et al. | |
| 2010/0180043 A1* | 7/2010 | Lau et al. | 709/231 |
| 2010/0299308 A1* | 11/2010 | Prasad et al. | 707/622 |
| 2011/0004584 A1* | 1/2011 | Goyal et al. | 707/622 |
| 2011/0238828 A1* | 9/2011 | Grigsby et al. | 709/224 |
| 2011/0258257 A1* | 10/2011 | Previdi | 709/205 |
| 2012/0155646 A1* | 6/2012 | Seshadri et al. | 380/279 |
| 2013/0018714 A1* | 1/2013 | George | 705/14.16 |
| 2013/0091207 A1* | 4/2013 | Diab | 709/204 |
| 2013/0091221 A1* | 4/2013 | Bennett | 709/204 |
| 2013/0166659 A1* | 6/2013 | Champel et al. | 709/206 |
| 2013/0212488 A1* | 8/2013 | Scherpa | 715/753 |
| 2013/0212490 A1* | 8/2013 | Scherpa | 715/753 |
| 2013/0218961 A1* | 8/2013 | Ho | 709/204 |
| 2013/0219339 A1* | 8/2013 | Wiese et al. | 715/833 |
| 2013/0232030 A1* | 9/2013 | Gockeler et al. | 705/26.8 |
| 2013/0275559 A1* | 10/2013 | Bradley | 709/219 |
| 2013/0276074 A1* | 10/2013 | Orsini et al. | 726/5 |
| 2013/0325964 A1* | 12/2013 | Berberat | 709/204 |
| 2013/0325966 A1* | 12/2013 | Tseng | 709/204 |
| 2013/0332525 A1* | 12/2013 | Liu et al. | 709/204 |
| 2014/0019552 A1* | 1/2014 | Oh | 709/204 |
| 2014/0019553 A1* | 1/2014 | Bill | 709/204 |
| 2014/0032670 A1* | 1/2014 | Ellingson et al. | 709/204 |
| 2014/0067950 A1* | 3/2014 | Winograd | 709/204 |
| 2014/0074923 A1* | 3/2014 | Vasudevan et al. | 709/204 |
| 2014/0074927 A1* | 3/2014 | Rodriguez et al. | 709/204 |
| 2014/0089378 A1* | 3/2014 | Forrest et al. | 709/202 |
| 2014/0143338 A1* | 5/2014 | Jung et al. | 709/204 |

OTHER PUBLICATIONS

IBM, "Object Grid Transactional Cache Client," IPCOM000138628D, http://priorartdatabase.com/IPCOM/000138628, Jul. 27, 2006.

* cited by examiner

CACHE SHARING OF ENTERPRISE DATA AMONG PEERS VIA AN ENTERPRISE SERVER

TECHNICAL FIELD

The present invention relates generally to enterprise mobility, and more particularly to cache sharing of enterprise data among peers via an enterprise server.

BACKGROUND

Enterprise mobility refers to the use of mobile devices (also known as a handheld device, handheld computer or simply handheld) (e.g., a mobile phone, a cellular phone, a smartphone, a tablet computer, a person digital assistant (PDA) and the like) by employees of enterprises (referring to businesses, companies, government entities, etc.) enabling the employees to work from remote locations.

Employees may request access to enterprise data from a server at the enterprise (enterprise server). The requested enterprise data may be stored in a cache in an attempt to provide faster access to the data. In some embodiments, the enterprise system may distribute the cache across multiple server hosts (may be co-located or spread over different geographical regions).

However, enterprise caching currently requires the cache servers or cache processes to be planned and setup before hand. Since the employees with their mobile devices may be located at various locations, a distributed caching schema will require the servers to be located in various data centers to provide alternative, closer and faster access to data. As a result, such a schema is costly to implement.

BRIEF SUMMARY

In one embodiment of the present invention, a method for performing cache sharing of enterprise data among peers comprises receiving a request from a first mobile device for enterprise data. The method further comprises analyzing the received request for the enterprise data to generate a signature of the received request. Additionally, the method comprises identifying one or more peer mobile devices that possess the enterprise data in a cache in response to determining that the enterprise data is stored on one or more peer mobile devices based on the signature of the received request. Furthermore, the method comprises selecting one of the one or more identified peer mobile devices that possesses the enterprise data using an algorithm. In addition, the method comprises sending, by a processor, a message to the selected peer mobile device, where the message comprises connection details of the first mobile device and a key that uniquely identifies the enterprise data, and where the selected peer mobile device transfers the enterprise data to the first mobile device using the connection details of the first mobile device in response to identifying the enterprise data in the cache of the selected peer mobile device using the key.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for performing cache sharing of enterprise data among peer mobile devices. In one embodiment of the present invention, an enterprise server receives a request from a mobile device for enterprise data. Upon generating a signature of the request, the enterprise server determines if there are any peer mobile devices that store the requested enterprise data by comparing the generated signature with the stored signatures of other requests that have been previously serviced by the enterprise server and whose responses (i.e., requested enterprise data) are stored in a peer mobile device(s). If the enterprise server identifies a peer mobile device(s) that possess the requested enterprise data, then the enterprise server selects one of these peer mobile devices to provide the requested enterprise data to the requesting mobile device based on an algorithm, which may be based on factors, such as geographic proximity to the requesting mobile device and quality of the network. A message may be sent to the selected peer mobile device from the enterprise sever to provide the requested enterprise data to the requesting mobile device, where the message includes connection details of the requesting mobile device as well as a key that uniquely identifies the requested enterprise data that is stored in a cache of the peer mobile device. In this manner, the enterprise data may be shared in a robust and transparent manner by having the enterprise data being stored in and transferred from a cache of a peer mobile device to a requesting mobile device while at the same time providing the enterprise control over the dissemination of the enterprise data.

While the following discusses the present invention in connection with enterprise mobility, the principles of the present invention may be applied to other forms of computing devices that are geographically distributed. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
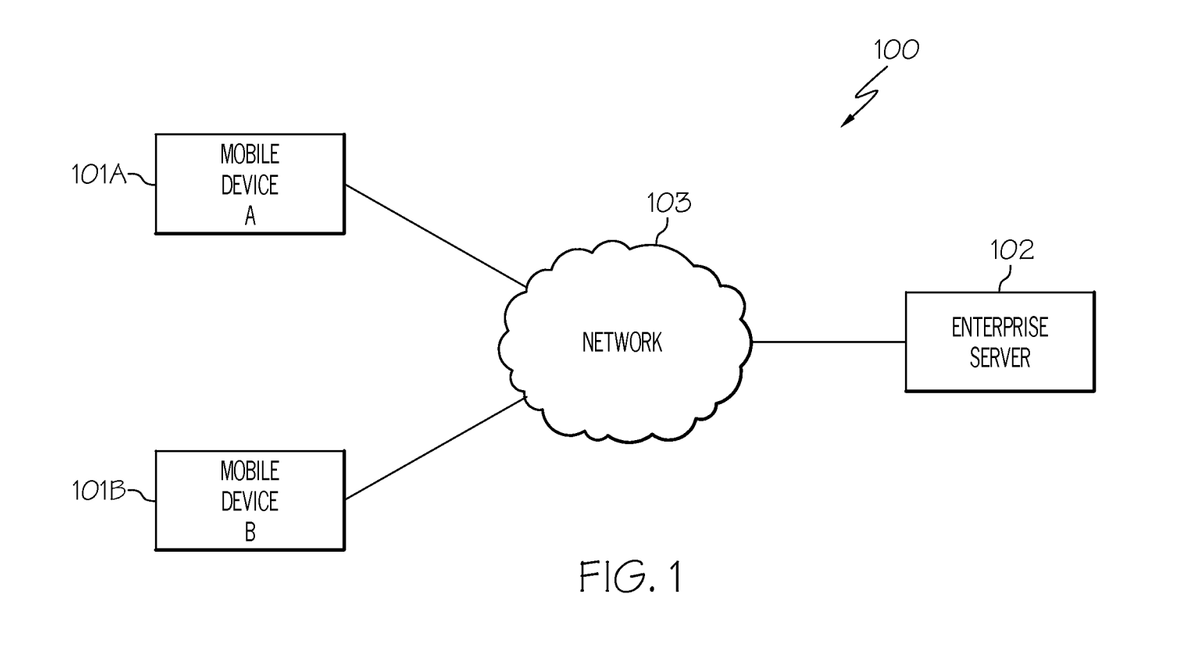
FIG. 1 illustrates a network system for practicing the principles of the present invention in accordance with an embodiment of the present invention.

Referring now to the Figures in detail, FIG. 1 illustrates a network system 100 for practicing the principles of the present invention in accordance with an embodiment of the present invention. Network system 100 includes mobile devices 101A-101B (identified as "Mobile Device A," and "Mobile Device B," respectively, in FIG. 1) in wireless communication with an enterprise server 102 via a network 103. Mobile devices 101A-101B may collectively or individually be referred to as mobile devices 101 or mobile device 101, respectively. Mobile device 101 may be any mobile computing device, including, but not limited to, a mobile phone, a cellular phone, a smartphone, a personal digital assistance (PDA), a gaming unit, a portable computing unit, a tablet personal computer and the like. System 100 may include any number of mobile devices 101 and the depiction of two mobile devices 101 is for illustrative purposes. A description of one embodiment of the hardware configuration of mobile device 101 is provided below in connection with FIG. 2.

As discussed above, mobile device 101 is in wireless communication with enterprise server 102 via a network 103, which may be, for example, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Enterprise server 102 may reside at an enterprise (e.g., company, business, government entity) and is configured to keep track of enterprise data being stored on which peer mobile devices 101. Enterprise server 102 is further configured to inform the appropriate peer mobile device 101 to transfer the requested enterprise data to the requesting mobile device 101 as discussed further below. A description of one embodiment of the hardware configuration of enterprise server 102 is provided below in connection with FIG. 3.

Figure 2:
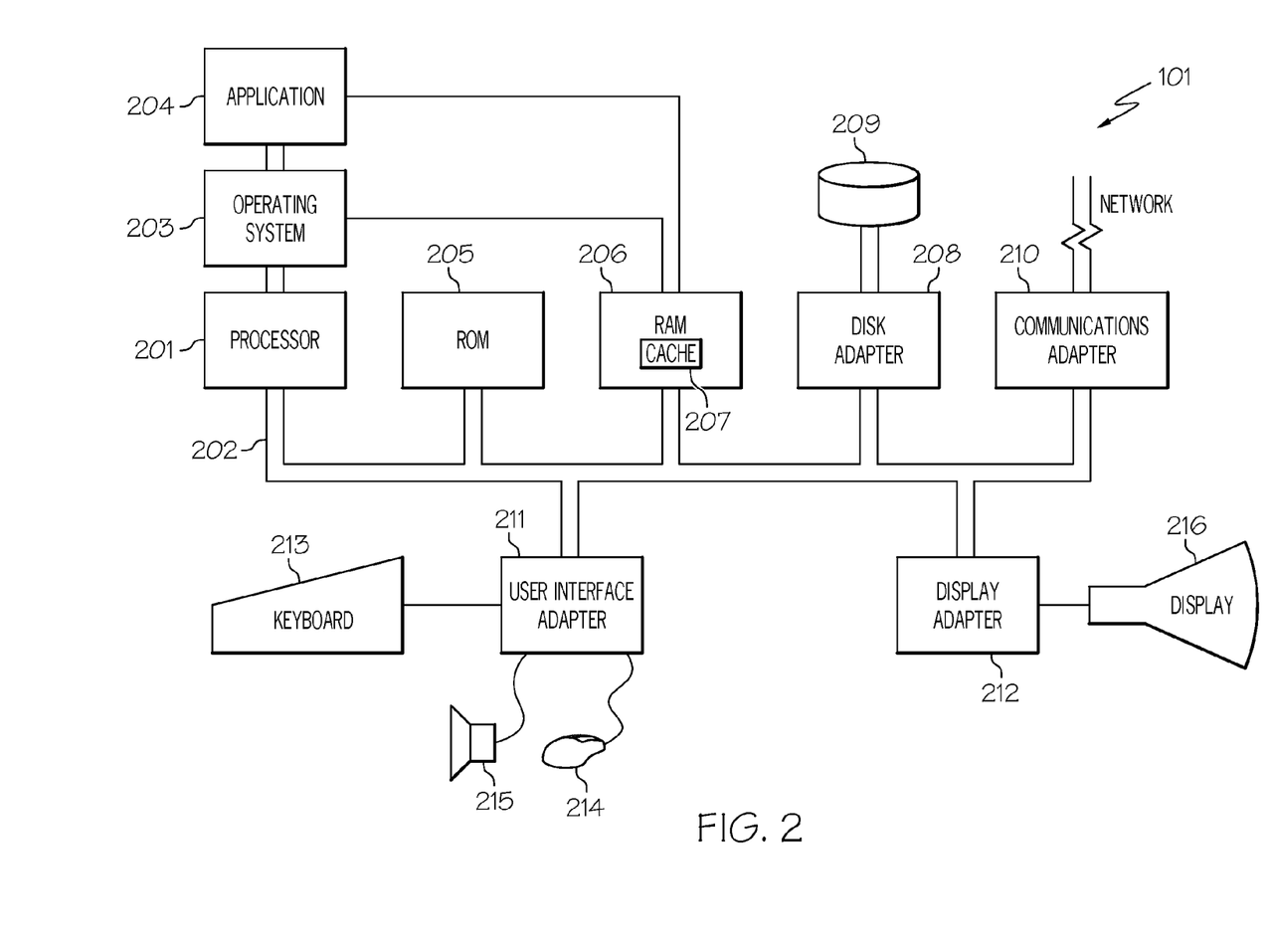
FIG. 2 illustrates a hardware configuration of a mobile device in accordance with an embodiment of the present invention.

Referring now to FIG. 2, FIG. 2 illustrates a hardware configuration of mobile device 101 (FIG. 1) which is representative of a hardware environment for practicing the present invention. Referring to FIG. 2, mobile device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for storing and transferring enterprise data among peers as discussed further below in association with FIGS. 4A-4B.

Referring again to FIG. 2, read-only memory ("ROM") 205 is coupled to system bus 202 and includes a basic input/output system ("BIOS") that controls certain basic functions of mobile device 101. Random access memory ("RAM") 206 and disk adapter 208 are also coupled to system bus 202. It should be noted that software components including operating system 203 and application 204 may be loaded into RAM 206, which may be mobile device's 101 main memory for execution. In one embodiment, RAM 206 may include a cache 207 configured to store enterprise data and a key used to identified the data as discussed further below in association with FIGS. 4A-4B. It is noted that cache 207 may reside in other locations (e.g., disk unit 209) and that cache 207 may be part of another cache, such as a user interface cache. Mobile device 101 further includes disk adapter 208, which may be an integrated drive electronics ("IDE") adapter that communicates with disk unit 209, e.g., disk drive.

Mobile device 101 may further include a communications adapter 210 coupled to bus 202. Communications adapter 210 interconnects bus 202 with an outside network (network 103 of FIG. 1) thereby enabling mobile device 101 to communicate with enterprise server 102 (FIG. 1) and peer mobile devices 101.

I/O devices may also be connected to mobile device 101 via a user interface adapter 211 and a display adapter 212. Keyboard 213, mouse 214 and speaker 215 may all be interconnected to bus 202 through user interface adapter 211. A display monitor 216 may be connected to system bus 202 by display adapter 212. In this manner, a user is capable of inputting to mobile device 101 through keyboard 213 or mouse 214 and receiving output from mobile device 101 via display 216 or speaker 215. Other input mechanisms may be used to input data to mobile device 101 that is not shown in FIG. 2, such as display 216 having touch-screen capability.

Figure 3:
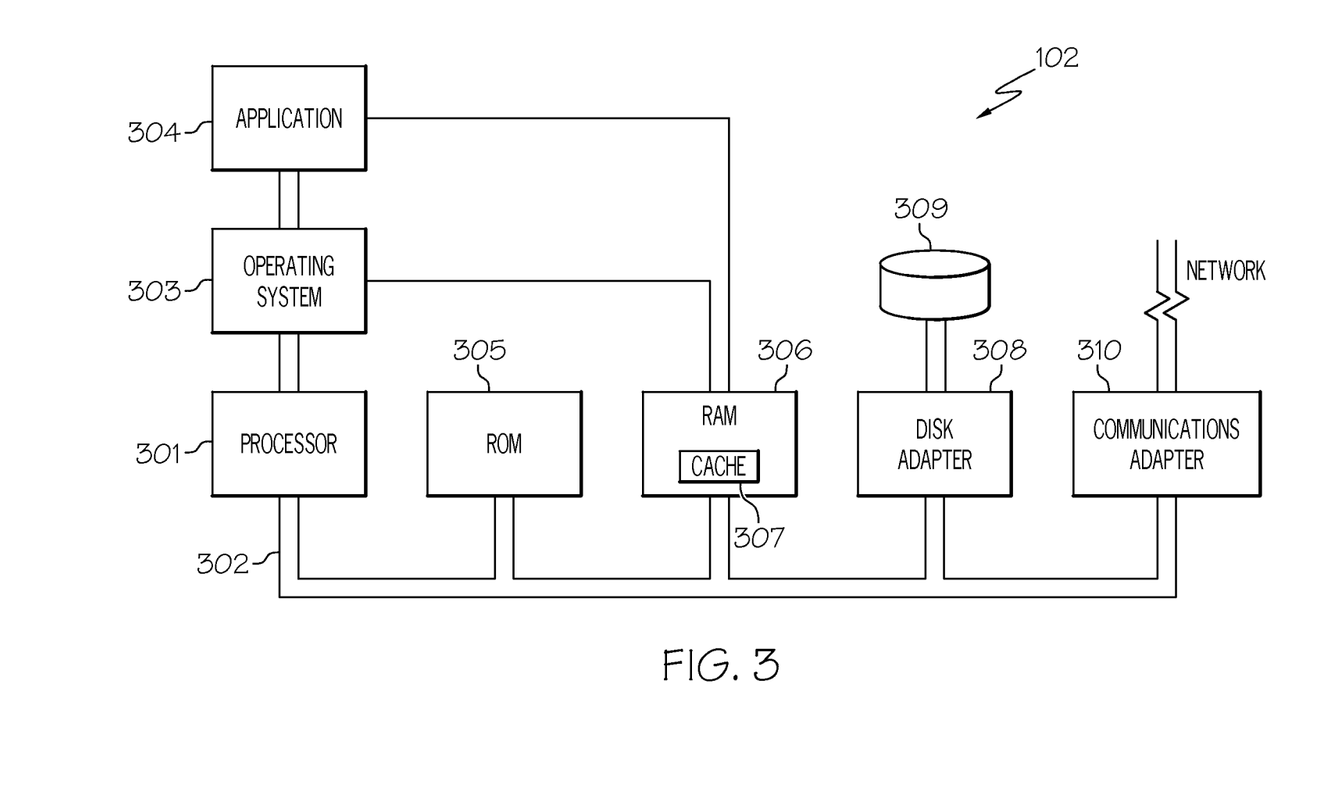
FIG. 3 illustrates a hardware configuration of an enterprise server in accordance with an embodiment of the present invention.

Referring now to FIG. 3, FIG. 3 illustrates a hardware configuration of enterprise server 102 (FIG. 1) which is representative of a hardware environment for practicing the present invention. Referring to FIG. 3, enterprise server has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for performing cache sharing of enterprise data among peer mobile devices 101 (FIG. 1) as discussed further below in association with FIGS. 4A-4B.

Referring again to FIG. 3, read-only memory ("ROM") 305 is coupled to system bus 302 and includes a basic input/output system ("BIOS") that controls certain basic functions of enterprise server 102. Random access memory ("RAM") 306 and disk adapter 308 are also coupled to system bus 302. It should be noted that software components including operating system 303 and application 304 may be loaded into RAM 306, which may be enterprise server's 102 main memory for execution. In one embodiment, RAM 306 may include a cache 307 configured to store enterprise data as discussed further below in association with FIGS. 4A-4B. It is noted that cache 307 may reside in other locations (e.g., disk unit 309) and that cache 307 may be part of another cache. Enterprise server 102 further includes disk adapter 308, which may be an integrated drive electronics ("IDE") adapter that communicates with disk unit 309, e.g., disk drive. In one embodiment, disk unit 309 stores a table that is used for storing various information (e.g., a signature of the request for enterprise data, a key used to identify the enterprise data and information used to identify the peer mobile device 101 that stores the enterprise data) that is used in connection with performing cache sharing of enterprise data among peer mobile devices 101 as discussed further below in association with FIGS. 4A-4B. It is noted that the scope of the present invention is not to be limited to having such a table stored in disk unit 309 and that such a table may be stored in other locations, including external to enterprise server 102.

Enterprise sever 102 may further include a communications adapter 310 coupled to bus 302. Communications adapter 310 interconnects bus 302 with an outside network (network 103 of FIG. 1) thereby enabling enterprise server 102 to communicate with mobile devices 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, employees may request access to enterprise data from a server at the enterprise (enterprise server). The requested enterprise data may be stored in a cache in an attempt to provide faster access to the data. In some embodiments, the enterprise system may distribute the cache across multiple server hosts (may be co-located or spread over different geographical regions). However, enterprise caching currently requires the cache servers or cache processes to be planned and setup before hand. Since the employees with their mobile devices may be located at various locations, a distributed caching schema will require the servers to be located in various data centers to provide alternative, closer and faster access to data. As a result, such a schema is costly to implement.

The principles of the present invention provide a means for efficiently implementing a peer-to-peer sharing of enterprise data among peer mobile devices that is controlled by the enterprise server. In this manner, the enterprise data may be shared in a robust and transparent manner by having the enterprise data being stored in and transferred from a cache of a peer mobile device to a requesting mobile device while at the same time providing a trustworthy solution since the enterprise server is responsible for identifying appropriate mobile devices to provide the requesting enterprise data and to ensure that the connection between the providing peer mobile device and the requesting mobile device is authorized. By having the transfer of enterprise data being performed by a peer mobile device, the ports of the enterprise server are free to process other requests. Furthermore, by having the enterprise server direct the transfer of the requesting enterprise data, the control of the transfer of the enterprise data is still maintained by the enterprise. A discussion of performing cache sharing of enterprise data among peer mobile devices is provided below in connection with FIGS. 4A-4B.

Figure 4A:
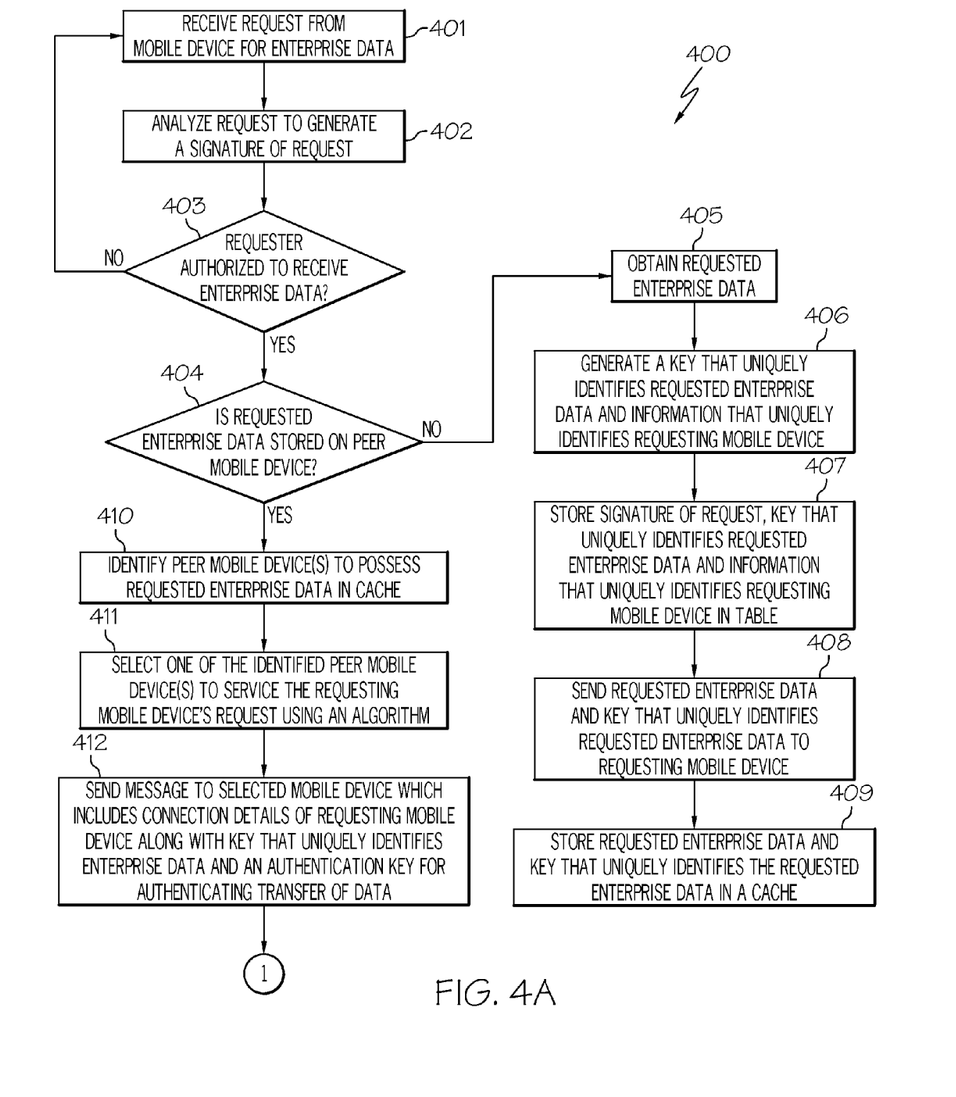
FIGS. 4A-4B are a flowchart of a method for performing cache sharing of enterprise data among peer mobile devices in accordance with an embodiment of the present invention.
Figure 4B:
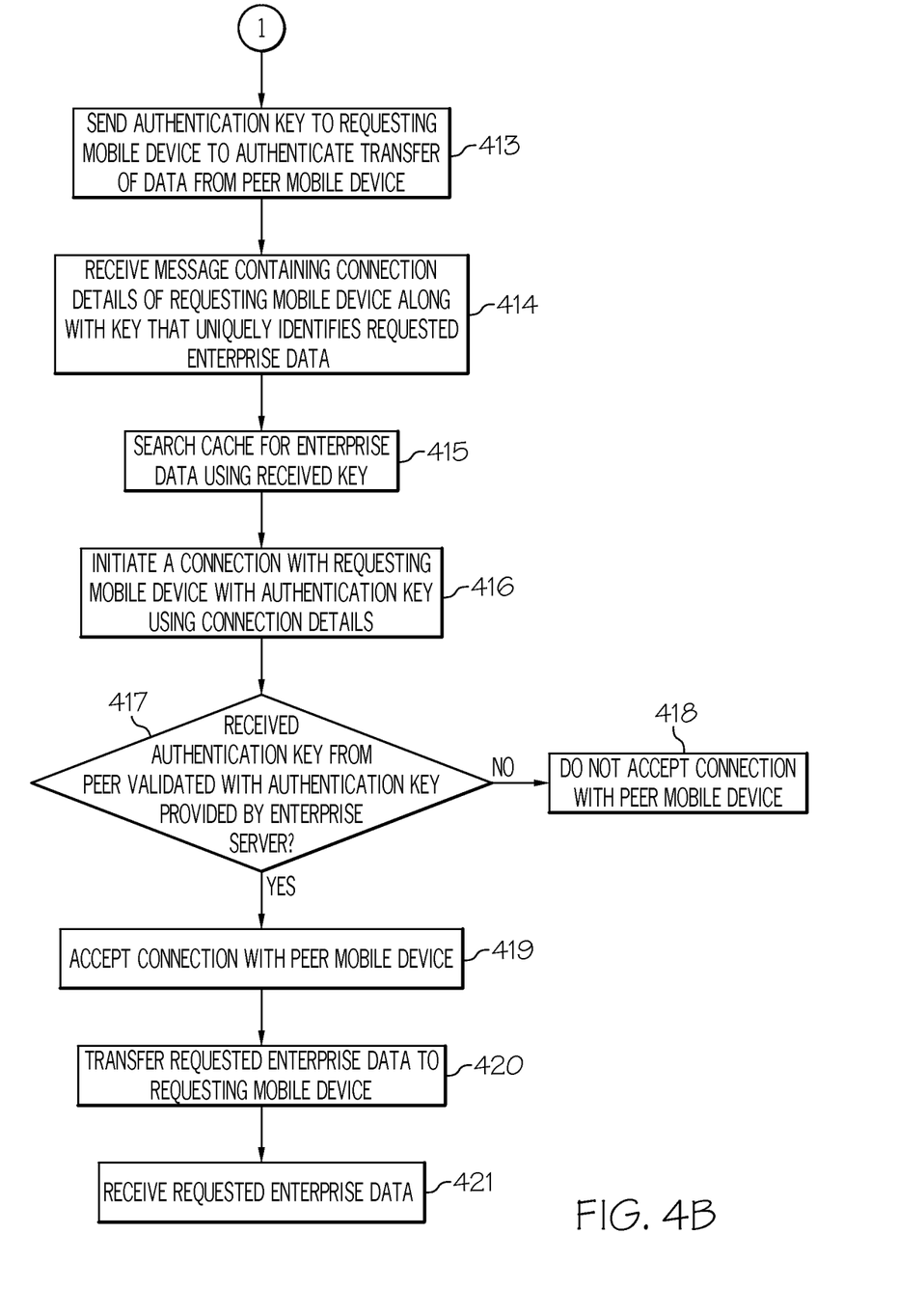

FIGS. 4A-4B are a flowchart of a method 400 for performing cache sharing of enterprise data among peer mobile devices 101 (FIG. 1) in accordance with an embodiment of the present invention.

Referring to FIG. 4A, in conjunction with FIGS. 1-3, in step 401, enterprise server 102 receives a request from mobile device 101 (e.g., mobile device 101A) for enterprise data.

In step 402, enterprise server 102 analyzes the received request to generate a signature of the received request. In one embodiment, a signature is generated that is compared to the signatures of requests that have been previously serviced by enterprise server 102. For example, after each request has been serviced, the signature of the request, a key used to identify the response (or the requested enterprise data) as well as information used to identify the peer mobile device 101 that can fulfill the request (i.e., the information used to identify the peer mobile device 101 that stores the requested enterprise data in its cache 207) may be stored in a table, such as in disk unit 309. In one embodiment, enterprise server 102 can compare the generated signature with the signatures in this table to determine if there is a match. If there is a match, then such a request has been serviced and the requesting enterprise data may be provided to the requesting mobile device 101 (e.g., mobile device 101A) by a peer mobile device 101 (e.g., mobile device 101B). If there is not a match, then such a request has not been previously serviced by enterprise server 102.

In step 403, a determination is made by enterprise server 102 as to whether the requester is authorized to receive the requested enterprise data. In one embodiment, enterprise server 102 may determine whether the requester is authorized to receive the requested enterprise data by comparing an identification of the peer mobile device 101 with identifications of authorized mobile devices 101 stored in a table, such as in disk unit 309. If there is a match, then the requester is authorized to receive the requested enterprise data. Otherwise, the requester is not authorized to receive the requested enterprise data.

If the requester is not authorized to receive the requested enterprise data, then enterprise server 102 waits to receive another request from mobile device 101 for enterprise data in step 401.

If, however, the requester is authorized to receive the requested enterprise data, then in step 404, a determination is made by enterprise server 102 as to whether the requested enterprise data is stored on a peer mobile device 101. As discussed above, in one embodiment, enterprise sever 102 compares the generated signature (generated in step 402) with the signatures in this table to determine whether the requested enterprise data is stored on a peer mobile device 101.

If the requested enterprise data is not stored on a peer mobile device 101, then, in step 405, enterprise server 102 obtains the requested enterprise data, such as from its cache 307. In one embodiment, enterprise server 102 obtains the requested enterprise data from a resource manager, such as from a relational database management system or a file system.

In step 406, enterprise server 102 generates a key that uniquely identifies the requested enterprise data as well as information (e.g., an identification) that uniquely identifies the requesting mobile device 101 (e.g., mobile device 101A).

In step 407, enterprise server 102 stores the signature of the request (generated in step 402), the key that uniquely identifies the requested enterprise data and information (e.g., identification) that uniquely identifies the requesting mobile device 101 (e.g., mobile device 101A) in a table, such as in disk unit 309.

In step 408, enterprise server 407 sends a message to the requesting mobile device 101 (e.g., mobile device 101A) that includes the requested enterprise data and the key that uniquely identifies the requested enterprise data (generated in step 406). In one embodiment, such a message may include metadata that instructs that requesting mobile device 101 to update its cache 207 by installing the requested enterprise data along with the key that uniquely identifies the requested enterprise data.

Upon receipt of the message, in step 409, the requesting mobile device 101 (e.g., mobile device 101) stores the requested enterprise data and key that uniquely identifies the requested enterprise data in a cache, such as cache 207. In this manner, the requested enterprise data stored in cache 207 of mobile device 101 may later be provided to other peer mobile devices 101 as discussed below. In one embodiment, the stored enterprise data may be protected against manipulation, such as by having the data encrypted.

Returning to step 404, if, however, the requested enterprise data is stored on a peer mobile device 101, then, in step 410, enterprise server 102 identifies the peer mobile device(s) 101 to possess the requested enterprise data in its cache 207. As discussed above, enterprise server 102 compares the generated signature (generated in step 402) with the signatures stored in a table to determine if there is a match. If there is a match, then the peer mobile device(s) 101 that store the requested enterprise data may be identified based on the information (e.g., identification(s)) stored in that table entry (table entry with the matching signature) that uniquely identifies the peer mobile device(s) 101 that store the requested enterprise data.

In step 411, enterprise server 102 selects one of the identified peer mobile device(s) 101 (e.g., mobile device 101B) that possesses the requested enterprise data to service the requesting mobile device 101 using an algorithm. In one embodiment, the algorithm is based on one or more of the following: geographic proximity to the requesting mobile device 101 and quality of the network. In one embodiment, the algorithm takes into consideration whether the enterprise data stored in cache 207 is stale, which can be based on time (e.g., data becomes state after an expiration date) or through invalidation triggers.

In step 412, enterprise server 102 sends a message to the selected mobile device 101 (e.g., mobile device 101B) which includes the connection details of the requesting mobile device 101 (e.g., mobile device 101A) along with a key that uniquely identifies the enterprise data and an authentication key used for authenticating the transfer of enterprise data to the requesting mobile device 101 (e.g., mobile device 101A). In one embodiment, the connection details of the requesting mobile device 101 (e.g., mobile device 101A) are obtained directly from the requesting mobile device 101. In one embodiment, upon matching the generated signature (generated in step 402) with a signature of a request previously serviced by enterprise server 102 stored in a table (as discussed above in connection with step 404), enterprise server 102 may obtain information about servicing such a request, such as a key that identifies the requesting enterprise data as well as information (e.g., identification) used to uniquely identify the peer mobile device(s) 101 (e.g., mobile device 101B) that can provide the requesting enterprise data. Once one of these peer mobile device(s) 101 that can provide the requesting enterprise data has been selected (as discussed above in connection with step 411) to provide the requested enterprise data, a message may be sent to the selected mobile device 101 by enterprise server 102 that includes the connection details of the requesting mobile device 101 as well as the key that identifies the requesting enterprise data obtained from the table.

Referring to FIG. 4B, in conjunction with FIGS. 1-3, in step 413, enterprise server 102 sends an authentication key to the requesting mobile device 101 (e.g., mobile device 101A) to authenticate the transfer of enterprise data to the requesting mobile device 101 (e.g., mobile device 101A) from the selected mobile device 101 (e.g., mobile device 101B). The authentication key sent to the requesting mobile device 101 is the same as the authentication key sent to the peer mobile device in step 412. In this manner, the requesting mobile device 101 can validate the transfer of data from the peer mobile device 101 by receiving the matching authentication key. It is noted that the validity of the authentication key can be configurable (e.g., valid for a session, valid over a selected period of time, valid until the next logoff, etc.). It is noted that the principles of the present invention are not to be limited in scope to such a use of authentication keys to ensure the validity of the transfer of enterprise data from a peer mobile device 101, but instead, the principles of the present invention cover all protocols that may be used for ensuring the validity of the transfer of enterprise data from a peer mobile device 101.

In step 414, the selected peer mobile device 101 (e.g., mobile device 101B) receives the message containing the connection details of the requesting mobile device 101 (e.g., mobile device 101A) along with a key that uniquely identifies the requested enterprise data.

In step 415, the selected peer mobile device 101 (e.g., mobile device 101B) searches its cache 207 for the enterprise data using the received key. In one embodiment, cache 207 may include a table of enterprise data that is uniquely indexed by a key that is provided by enterprise server 102.

In step 416, the selected peer mobile device 101 (e.g., mobile device 101B) initiates a connection with the requesting mobile device 101 (e.g., mobile device 101A) with the received authentication key (received in step 412) using the received connection details (received in step 412).

In step 417, a determination is made by the requesting mobile device 101 (e.g., mobile device 101A) as to whether the received authentication key from the peer mobile device 101 (e.g., mobile device 101B) is validated with the authentication key provided by enterprise server 102 (provided in step 413).

If the received authentication key from the peer mobile device 101 is not validated, then, in step 418, the requesting mobile device 101 does not accept the connection with the peer mobile device 101.

If, however, the received authentication key from the peer mobile device 101 is validated, then, in step 419, the requesting mobile device 101 accepts the connection with the peer mobile device 101.

In step 420, the selected peer mobile device 101 (e.g., mobile device 101B) transfers the requested enterprise data to the requesting mobile device 101 (e.g., mobile device 101A). In step 421, the requesting mobile device 101 (e.g., mobile device 101A) receives the requested enterprise data.

In this manner, enterprise data may be provided to a requesting mobile device 101 (e.g., mobile device 101A) from a peer mobile device 101 (e.g., mobile device 101B) in a robust manner thereby freeing enterprise server 102 to perform other functions. Furthermore, in this manner, the enterprise still retains control and ensures security over the dissemination of enterprise data.

In some implementations, method 400 may include other and/or additional steps that, for clarity, are not depicted. Further, in some implementations, method 400 may be executed in a different order presented and that the order presented in the discussion of FIGS. 4A-4B is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for performing cache sharing of enterprise data among peers, the method comprising:
   receiving a request from a first mobile device for enterprise data;
   analyzing said received request for said enterprise data to generate a signature of said received request;
   identifying one or more peer mobile devices that possess said enterprise data in a cache in response to determining that said enterprise data is stored on said one or more peer mobile devices based on said signature of said received request;
   selecting one of said one or more identified peer mobile devices that possesses said enterprise data using an algorithm, wherein said algorithm is based on one or more of the following: geographic proximity to said first mobile device and quality of the network; and
   sending, by a processor, a message to said selected peer mobile device, wherein said message comprises connection details of said first mobile device and a key that uniquely identifies said enterprise data, wherein said selected peer mobile device transfers said enterprise data to said first mobile device using said connection details of said first mobile device in response to identifying said enterprise data in said cache of said selected peer mobile device using said key.

2. The method as recited in claim 1 further comprising:
   obtaining said requested enterprise data in response to determining that said enterprise data is not stored on said one or more peer mobile devices based on said signature of said received request;
   generating said key that uniquely identifies said enterprise data and information that uniquely identifies said first mobile device; and
   storing said signature, said key and said information that uniquely identifies said first mobile device.

3. The method as recited in claim 2 further comprising:
   sending said requested enterprise data and said key to said first mobile device to be stored in a cache of said first mobile device.

4. The method as recited in claim 1, wherein said message further comprises a first authentication key for authenticating said transfer of said enterprise data to said first mobile device from said selected peer mobile device.

5. The method as recited in claim 4 further comprising:
sending a second authentication key to said first mobile device to authenticate said transfer of said enterprise data to said first mobile device from said selected peer mobile device.

6. The method as recited in claim 5 further comprising:
initiating a connection with said first mobile device by said selected peer mobile device with said first authentication key using said connection details.

7. The method as recited in claim 6 further comprising:
accepting said connection with said selected peer mobile device by said first mobile device in response to said first authentication key matching said second authentication key.

8. A computer program product embodied in a non-transitory computer readable storage medium for performing cache sharing of enterprise data among peers, the computer program product comprising the programming instructions for:
receiving a request from a first mobile device for enterprise data;
analyzing said received request for said enterprise data to generate a signature of said received request;
identifying one or more peer mobile devices that possess said enterprise data in a cache in response to determining that said enterprise data is stored on said one or more peer mobile devices based on said signature of said received request;
selecting one of said one or more identified peer mobile devices that possesses said enterprise data using an algorithm, wherein said algorithm is based on one or more of the following: geographic proximity to said first mobile device and quality of the network; and
sending a message to said selected peer mobile device, wherein said message comprises connection details of said first mobile device and a key that uniquely identifies said enterprise data, wherein said selected peer mobile device transfers said enterprise data to said first mobile device using said connection details of said first mobile device in response to identifying said enterprise data in said cache of said selected peer mobile device using said key.

9. The computer program product as recited in claim 8 further comprising the programming instructions for:
obtaining said requested enterprise data in response to determining that said enterprise data is not stored on said one or more peer mobile devices based on said signature of said received request;
generating said key that uniquely identifies said enterprise data and information that uniquely identifies said first mobile device; and
storing said signature, said key and said information that uniquely identifies said first mobile device.

10. The computer program product as recited in claim 9 further comprising the programming instructions for:
sending said requested enterprise data and said key to said first mobile device to be stored in a cache of said first mobile device.

11. The computer program product as recited in claim 8, wherein said message further comprises a first authentication key for authenticating said transfer of said enterprise data to said first mobile device from said selected peer mobile device.

12. The computer program product as recited in claim 11 further comprising the programming instructions for:
sending a second authentication key to said first mobile device to authenticate said transfer of said enterprise data to said first mobile device from said selected peer mobile device.

13. A system, comprising:
a memory unit for storing a computer program for performing cache sharing of enterprise data among peers; and
a processor coupled to said memory unit, wherein said processor, responsive to said computer program, comprises:
circuitry for receiving a request from a first mobile device for enterprise data;
circuitry for analyzing said received request for said enterprise data to generate a signature of said received request;
circuitry for identifying one or more peer mobile devices that possess said enterprise data in a cache in response to determining that said enterprise data is stored on said one or more peer mobile devices based on said signature of said received request;
circuitry for selecting one of said one or more identified peer mobile devices that possesses said enterprise data using an algorithm, wherein said algorithm is based on one or more of the following: geographic proximity to said first mobile device and quality of the network; and
circuitry for sending a message to said selected peer mobile device, wherein said message comprises connection details of said first mobile device and a key that uniquely identifies said enterprise data, wherein said selected peer mobile device transfers said enterprise data to said first mobile device using said connection details of said first mobile device in response to identifying said enterprise data in said cache of said selected peer mobile device using said key.

14. The system as recited in claim 13, wherein said processor further comprises:
circuitry for obtaining said requested enterprise data in response to determining that said enterprise data is not stored on said one or more peer mobile devices based on said signature of said received request;
circuitry for generating said key that uniquely identifies said enterprise data and information that uniquely identifies said first mobile device; and
circuitry for storing said signature, said key and said information that uniquely identifies said first mobile device.

15. The system as recited in claim 14, wherein said processor further comprises:
circuitry for sending said requested enterprise data and said key to said first mobile device to be stored in a cache of said first mobile device.

16. The system as recited in claim 13, wherein said message further comprises a first authentication key for authenticating said transfer of said enterprise data to said first mobile device from said selected peer mobile device.

17. The system as recited in claim 16, wherein said processor further comprises:
circuitry for sending a second authentication key to said first mobile device to authenticate said transfer of said enterprise data to said first mobile device from said selected peer mobile device.

* * * * *